US008205862B2

(12) United States Patent
Göltenboth et al.

(10) Patent No.: US 8,205,862 B2
(45) Date of Patent: Jun. 26, 2012

(54) DEVICE FOR MIXING WATER AND GAS

(75) Inventors: Frank Göltenboth, Blaustein (DE); Wolfgang Scheible, Ettlenschiess (DE)

(73) Assignee: WMF Wuerttembergische Metallwarenfabrik AG, Geislingen (DE)

( * ) Notice: Subject to any disclaimer, the term of this patent is extended or adjusted under 35 U.S.C. 154(b) by 944 days.

(21) Appl. No.: 12/180,002

(22) Filed: Jul. 25, 2008

(65) Prior Publication Data

US 2009/0026637 A1 Jan. 29, 2009

(30) Foreign Application Priority Data

Jul. 26, 2007 (EP) .................................... 07014683

(51) Int. Cl.
*A23L 2/54* (2006.01)

(52) U.S. Cl. ........................ 261/81; 261/82; 261/DIG. 7

(58) Field of Classification Search .................... 261/81, 261/82, DIG. 7
See application file for complete search history.

(56) References Cited

U.S. PATENT DOCUMENTS

| | | | | |
|---|---|---|---|---|
| 2,223,348 | A * | 12/1940 | Boedeker et al. | 261/81 |
| 2,531,655 | A | 11/1950 | Thompson | |
| 3,756,576 | A * | 9/1973 | Tremolada | 261/35 |
| 4,822,531 | A | 4/1989 | Rudick et al. | |
| 6,060,092 | A * | 5/2000 | Oesterwind et al. | 426/67 |
| 2005/0127215 | A1* | 6/2005 | Lienhart et al. | 241/21 |
| 2010/0133708 | A1* | 6/2010 | Fischer | 261/94 |

FOREIGN PATENT DOCUMENTS

| | | | |
|---|---|---|---|
| DE | 3543022 | C1 | 8/1987 |
| DE | 10055856 | | 5/2002 |
| EP | 1 533 024 | A1 | 11/2004 |
| EP | 1 716 915 | A1 | 4/2006 |
| GB | 572242 | * | 9/1943 |
| JP | 57 063118 | A | 4/1982 |
| JP | 57171414 | A | 10/1982 |
| WO | WO 2005/009598 | | 3/2005 |
| WO | WO 2006/012874 | | 9/2006 |

OTHER PUBLICATIONS

European Search Report based on European Patent Application EP 07 01 4683.

* cited by examiner

*Primary Examiner* — Robert J Hill, Jr.
*Assistant Examiner* — Christopher P Jones
(74) *Attorney, Agent, or Firm* — Marshall, Gerstein & Borun LLP

(57) ABSTRACT

A device for mixing water and gas for drinking purposes including mixing of water and gas, in which a water supply and a gas supply end. The mixing includes a turbulence generator, having a housing containing a mixture of water and gas and a plunger with two frontal faces. The plunger and the housing can be moved relative to each other in an oscillating manner. A flow connection is provided between the two frontal faces of the plunger.

11 Claims, 2 Drawing Sheets

DEVICE FOR MIXING WATER AND GAS

The present application claims the benefit of priority of European Patent Application No. 07014683.2, filed Jul. 26, 2007. The entire text of the priority application is incorporated herein by reference in its entirety.

FIELD OF THE DISCLOSURE

The disclosure relates to a device for mixing water and gas for drinking purposes of the type illustrated in the preamble of claim 1.

BACKGROUND

A great number of devices with which drinking water is mixed with gas, such as, for example, CO2 or O2, is known. Most of these devices include a specially designed mixing means taking care of a fine distribution of the gas in the water which cannot be achieved by simple joining, possibly under elevated pressure. Such a mixing means is known, for example, from DE 10055856. The known mixing means includes a microstructure which finely distributes the water as well as the gas and combines them subsequently, so that the absorption of carbon dioxide is highly increased by the increased surface area of the water.

Another mixing means is known from WO 2006/012874 where it has been found out that the circulation pumps or booster pumps often used in dispensing equipment can also be used for carbonizing if they are combined with a reduction of the cross-sectional area in the applied line, providing further increase of pressure.

It is finally known from WO 2005/009598 to employ a turbulence means for mixing water with gas. The known means is preferably designed for introducing oxygen into salt water for supplying aqua-farms for marine animals. However, it can also be employed for carbonizing. In this citation, the centrifugal force is utilized by tangentially introducing a gas-water mixture into a cylindrical housing to improve the mixing result.

The known solutions, however, are normally quite complex and expensive. With the passive solutions (microstructure), the result moreover highly depends on the water's primary pressure which can possibly vary. The pump solution is substantially independent of the water's primary pressure, but it is only profitable where a correspondingly efficient pump has to be provided anyway.

SUMMARY OF THE DISCLOSURE

Thus, the object underlying the disclosure is to provide a device for mixing water and gas for drinking purposes which is of a simple construction, can be inexpensively manufactured and ensures good mixing of water and gas.

By the embodiment according to the disclosure, a turbulent flow is generated in the mixing device which highly increases the interface between water and gas. The mechanically generated turbulences provide atomization and thorough mixing of the gas bubbles and the water and thus an excellent dissolution of the gas in the water. As the turbulences by the mixing means according to the disclosure are exclusively based on the kinetic energy of the oscillating component, the mixing means according to the disclosure is independent of supply temperatures, flow velocities and pressure ratios or the change thereof in the course of the operation. Tests have shown that it is possible with the device according to the disclosure to achieve a relatively high gas content; for example, a CO2 content of more than 6 g/l in drinking water was achieved. disclosure.

It is particularly advantageous to already mix the gas into the water in a mixing section upstream of the plunger, so that water and gas enter the housing of the plunger together.

The oscillating movement can be effected by the water pressure itself, or preferably by a separate driving means, in particular by an electromagnet.

For a return movement and/or to dampen the oscillating movement, the plunger is spring borne.

To further increase the gas introduction, a booster device which further increases the pressure in the water/gas mixture can be additionally provided.

BRIEF DESCRIPTION OF THE DRAWINGS

One embodiment of the disclosure will be illustrated below with reference to the drawings, wherein.

DETAILED DESCRIPTION

Figure 1:
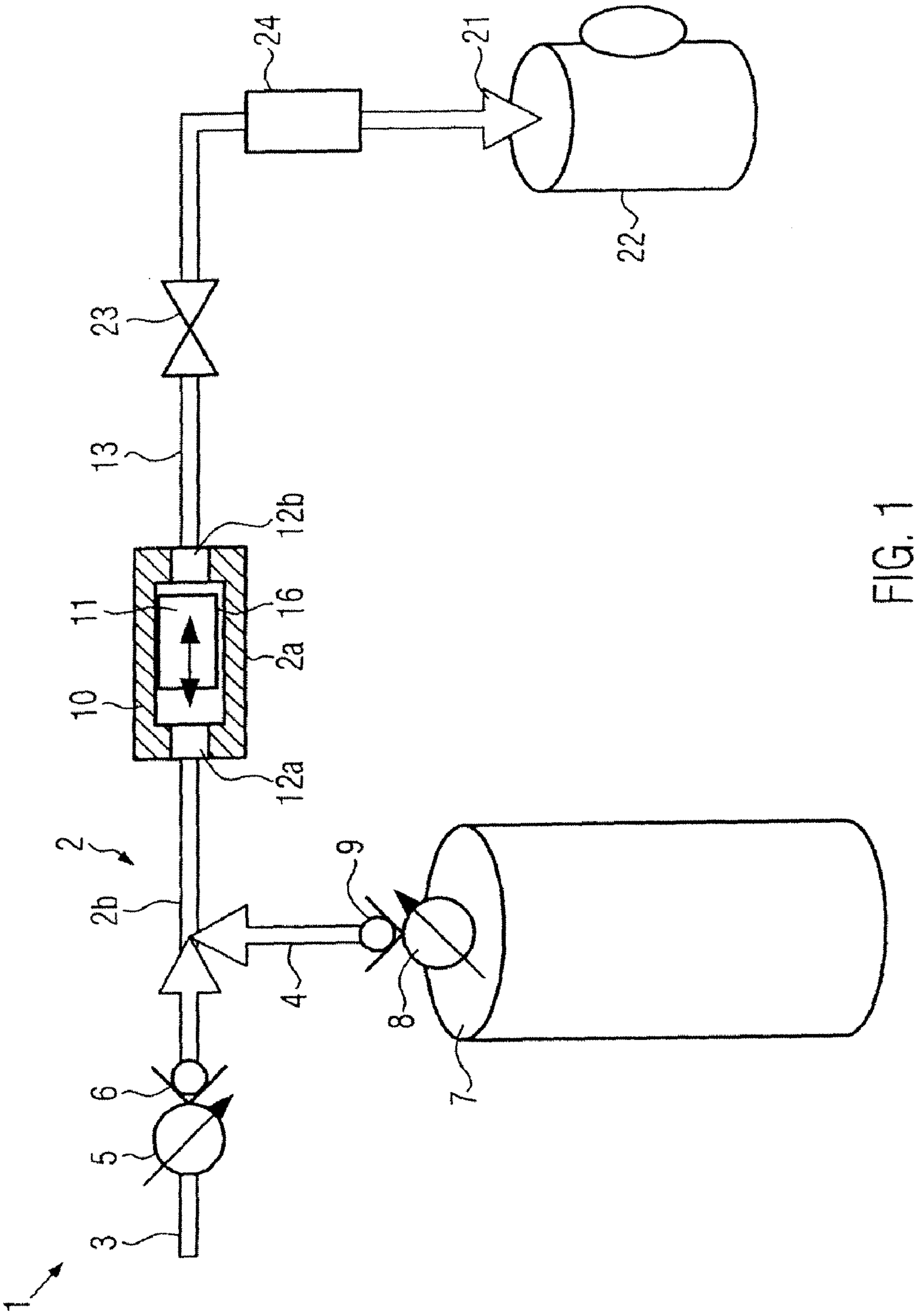
FIG. 1 shows a schematic representation of the device according to the disclosure.

FIG. 1 shows, in a highly schematized manner, a disclosure device 1 for mixing water and gas for drinking purposes. The device 1 is preferably designed for mixing drinking water with carbon dioxide (carbonizer), but it can also be employed for introducing oxygen or other gases.

The device 1 includes a mixing means 2 which, in the represented embodiment, includes a turbulence generator 2*a* and a mixing section 2*b*. A water supply 3 and a gas supply 4 end in the mixing means 2. The water supply 3 is preferably connected to the local drinking water supply network, it can, however, also be connected to a store tank. The water is preferably supplied under pressure, in particular under the pressure of the local water supply mains. A pressure regulator 5 and a check valve 6 are provided in the water intake 3. Instead of the pressure regulator 5, or in addition to the pressure regulator 5, an additional pump (not shown) can be provided, if necessary, such as a vibrating armature pump of a known design, to increase the pressure in the mixing means 2.

The gas supply 4 is preferably connected to a gas cylinder 7 or any other gas storage, again by a pressure regulator 8 and a check valve 9. Water and gas supplies 3, 4 end, in the represented embodiment, in a common line which is designed as mixing section 2*b* and permits a first mixing of gas and water. With the pressure regulators 5 and 8, the differential pressure required for the combination of gas and water can be adjusted. The mixing section 2*b* leads into the turbulence generator 2*a*. In the turbulence generator 2*a*, in the water/gas mixture which is introduced via the mixing section 2*b*, the introduced mechanical oscillations generate a turbulent flow which very finely distributes the gas in the water and thus provides for a good dissolution of the gas in the water.

The turbulence generator 2*a* includes a housing 10 in which a plunger 11 is arranged. The housing 10 and the plunger 11 can be oscillated relative to one another, in the preferred embodiment, the plunger 11 performing an oscillating movement in the housing 10.

Figure 2:
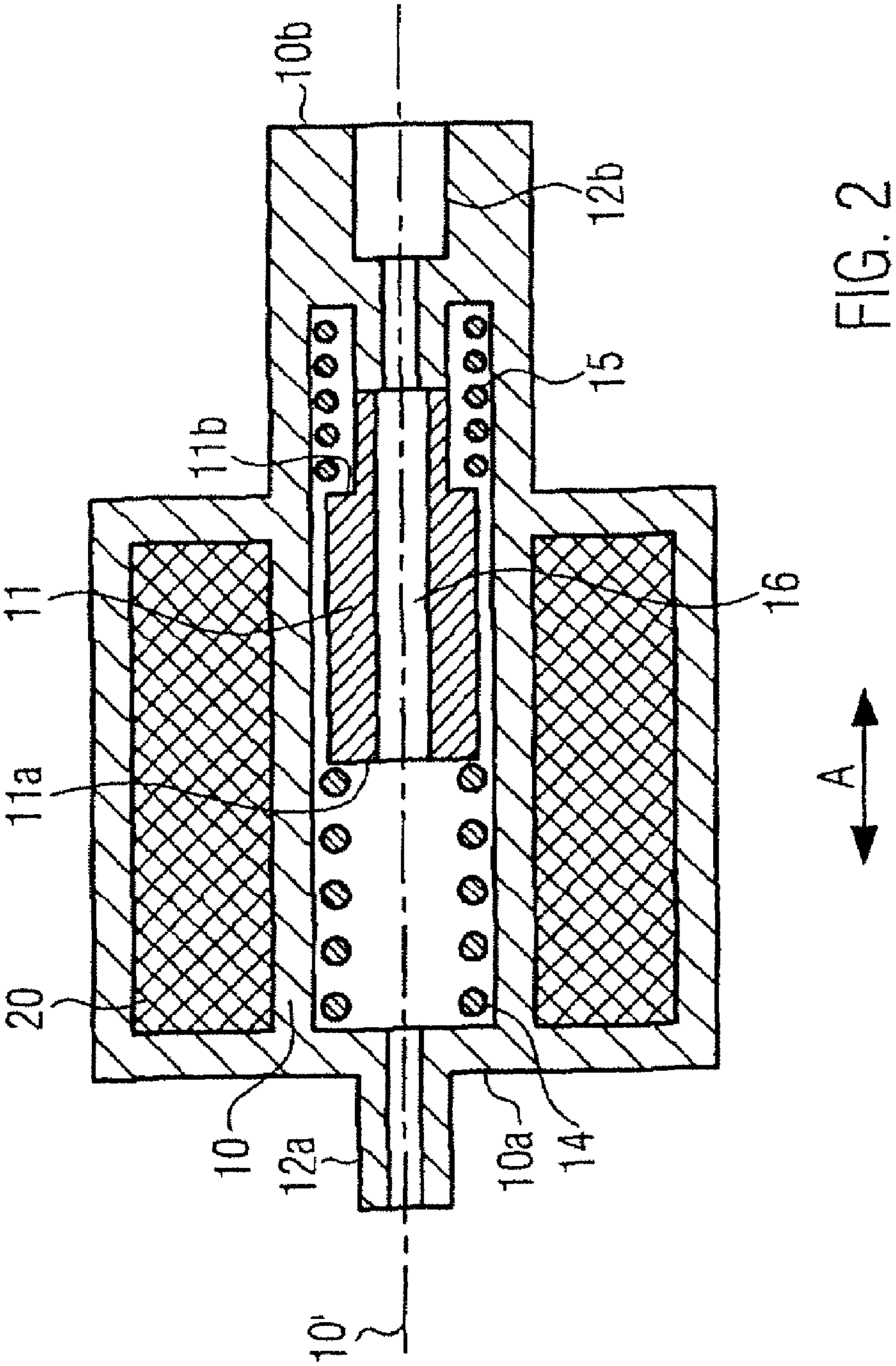
FIG. 2 shows a schematic representation of a section through a plunger/housing unit.

As can also be seen in connection with FIG. 2, the housing 10 is substantially cylindrical, preferably has a circular cylindrical design, and is provided at one frontal face 10*a* with an inlet connection 12*a* for connecting the preferably tubular mixing section 2*b*, wherein the connection 12*a* preferably extends coaxially to the longitudinal axis 10' of the housing 10. The second frontal face 10*b* of the housing 10 situated opposite to the inlet connection 12*a* is provided with an outlet connection 12*b* to which a dispensing line 13 is connected. The outlet connection 12*b*, too, extends coaxially to the longitudinal axis 10' of the housing 10.

The plunger 11 preferably also has a cylindrical design and can be reciprocated in the direction of the longitudinal axis 10' along the double-arrow A. The plunger 11 is preferably spring borne inside the housing 10. In the represented embodiment, the plunger 11 is borne by a first spring 14 which is designed as restoring spring and supported between a frontal face of the plunger 11 and a frontal face of the housing 10. The plunger 11 is borne by another spring 15 which is designed as absorbing spring and supported between the second frontal face of the plunger and the second frontal face of the housing 10. In the represented embodiment, the restoring spring is supported at the frontal face 10*a* facing the inlet 12*a* and the corresponding frontal face 11*a*, while the absorbing spring is supported between the opposite frontal faces 11*b*, 10*b* facing the dispensing line 13.

The turbulence generator 2*a* contains a flow connection 16 which connects the two frontal faces 11*a*, 11*b* of the plunger with each other. In the embodiment of FIG. 2, the flow connection 16 is designed as through hole through the plunger from one frontal face 11*a* to the opposite frontal face 11*b*. The through hole is preferably located in the longitudinal axis 10' of the housing 10 and substantially comprises a smooth wall surface.

However, the flow connection 16 can also be provided, as shown in FIGS. 1 and 2, respectively, at the periphery of the plunger 11 and/or in or outside the wall of the housing 10. The water/gas mixture can therefore optionally flow through the plunger and/or around the plunger.

The effective cross-section of flow of the flow connection 16 between the frontal faces 11*a* and 11*b* of the plunger 11 does not have to be larger, as shown in FIG. 2, than the effective cross-sections of flow in the regions of the inlet connection 12*a* and the outlet connection 12*b*, but it can be of the same size or smaller.

To generate the oscillating relative movement between the housing 10 and the plunger 11, a drive means 20 is preferably provided, which includes an electromagnet in the form of a magnet coil extending around the housing 10 and on which preferably an alternating voltage of 50 or 60 Hz acts. The plunger is oscillating at this frequency.

Alternatively, the movement can also be provided by an applied water pressure. In this case, the rotating motion of a rotor driven by the water/gas mixture has to be converted into the oscillating linear movement of the plunger.

The turbulence generator 2*a* can be designed as a usual vibrating armature pump from which the check valves have been removed.

The dispensing line 13 leads to a dispensing opening 21 under which a collecting basin 22, for example a drink or storage basin, can be placed and filled with the water mixed with gas. A discharge valve 23 is furthermore installed in the dispensing line 13 which is opened when the discharge of a drink through the dispensing opening 21 is desired. The dispensing line 13 preferably includes a compensator 24 of a common design which avoids too quick pressure release and effects a pressure reduction with a minimum stall to avoid too heavy gas emission.

The device according to the disclosure is provided with some type of control initiating and terminating a dispensing of water mixed with gas. In the simplest case, this can be a manually-actuated element by which the valve 23 is opened, so that the pressure prevailing in the water storage (local water supply) and/or in the gas storage (gas cylinder) presses water and gas through the device 1. Water and gas first reach the mixing section 2*b* for a first, rough mixing. Subsequently, this mixture enters the housing 10 where the mixture is swirled by the mechanical vibrations whereby the gas bubbles are increasingly shattered and a fine distribution of the gas in the water takes place. After it has left the mixing means 2, a slight pressure reduction takes place in the compensator 24 which prevents the gas from immediately escaping again from the water due to a sudden pressure reduction. Subsequently, the water mixed with gas flows into the drinking vessel.

If the oscillation is not generated by the water pressure itself, some means which switches on the drive means 20 is practical. This means can be, for example, an electric switch which provides the electromagnet with current and which is actuated together with the actuation of the valve 23.

As a modification of the described and drawn embodiments, the mixing section can possibly be omitted and water as well as gas can be directly supplied to the turbulence generator. Instead of carbon dioxide or in addition thereto, oxygen can be introduced. Instead of the plunger, the housing can be oscillated. Furthermore, not only a linear oscillation is conceivable. Rather any oscillating relative movement between plunger and housing is suited for the purposes of the present disclosure. The oscillating movement can be generated by other suited oscillating drives.

The invention claimed is:

1. Device for mixing water and gas for drinking purposes, comprising a mixing means for mixing water and gas, a water supply ending in the mixing means, a gas supply ending in the mixing means, the mixing means including a turbulence generator having a housing accommodating a mixture of water and gas, a plunger comprising two frontal faces, the plunger and the housing being movable with respect to each other in an oscillating manner, and a flow connection that is one of (a) a single through-hole extending longitudinally through the plunger between the frontal faces and (b) provided between an exterior surface of the plunger and an internal wall of the housing, wherein the plunger is imperforate between the frontal faces.

2. Device according to claim 1, wherein one of the water, gas supply, or combination thereof is effected under pressure.

3. Device according to claim 1, wherein the water supply is connected to a local water supply.

4. Device according to claim 1, wherein the gas supply is connected to a gas storage container.

5. Device according to claim 1, wherein the oscillating movement is generated by a drive means.

6. Device according to claim 5, wherein the oscillating movement is generated by an electromagnet.

7. Device according of claim 1, and a device for pressure increase is provided in the water/gas mixture.

8. Device according of claim 1, and a compensator is provided behind the mixing means in the flow direction.

9. Device according to claim 1, wherein the plunger is spring borne.

10. Device according of claim 9, wherein a first spring is disposed between a first frontal face of the plunger and a first frontal face of the housing, and wherein a second spring is disposed between a second frontal face of the plunger and a second frontal face of the housing.

11. Device according to claim 1, and a mixing section upstream of the turbulence generator in which the water and gas supplies end.

* * * * *